United States Patent Office 3,403,794
Patented Oct. 1, 1968

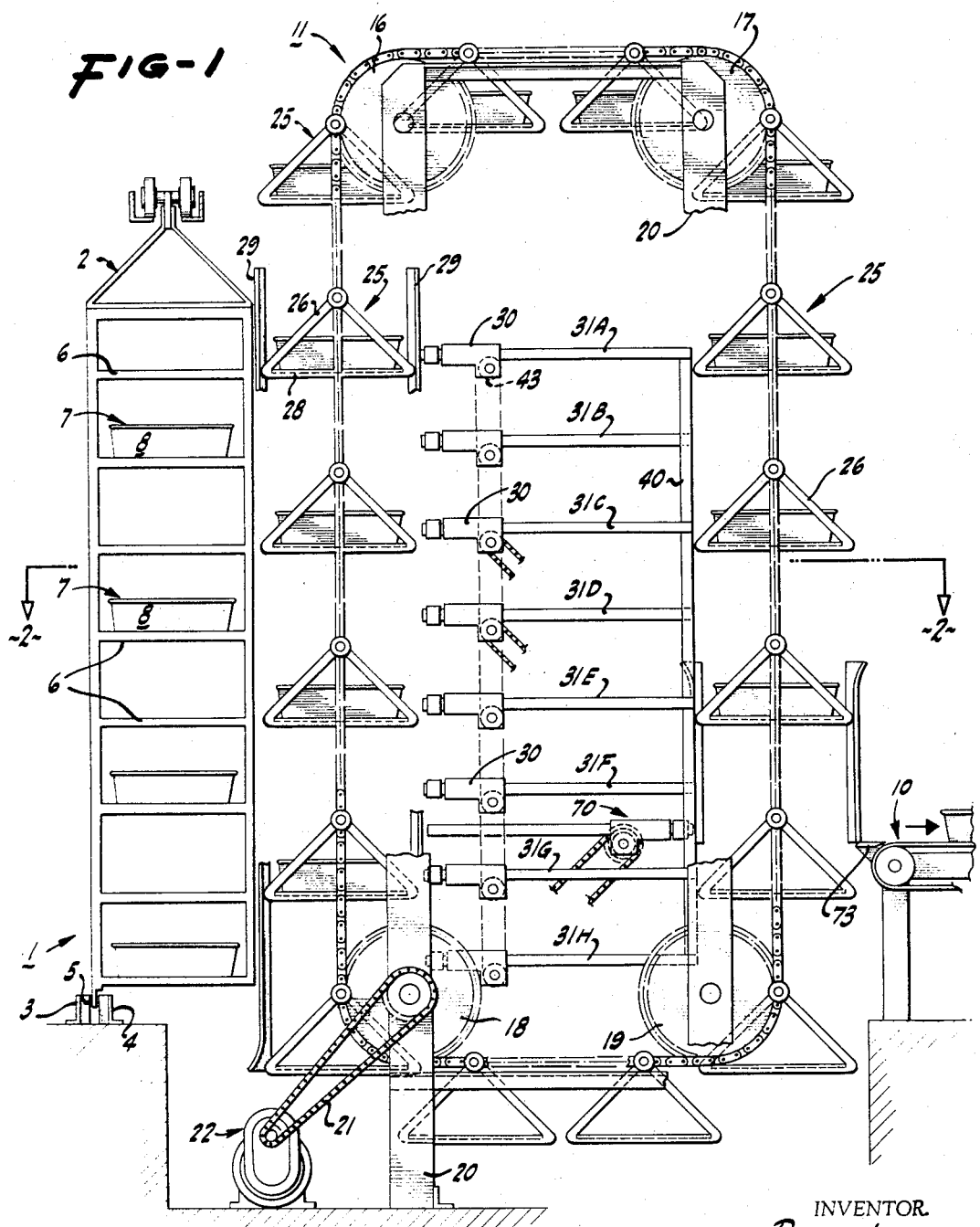

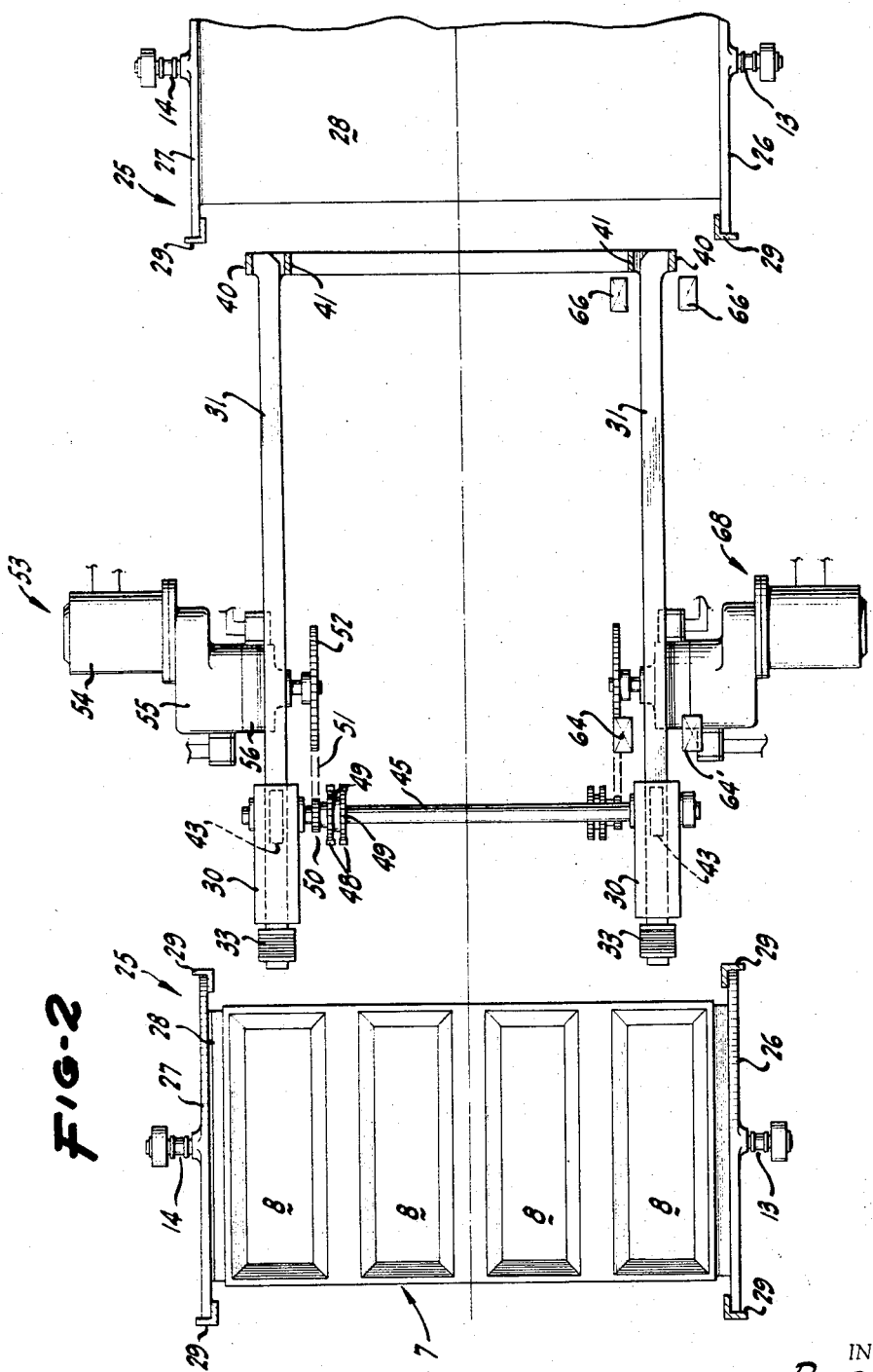

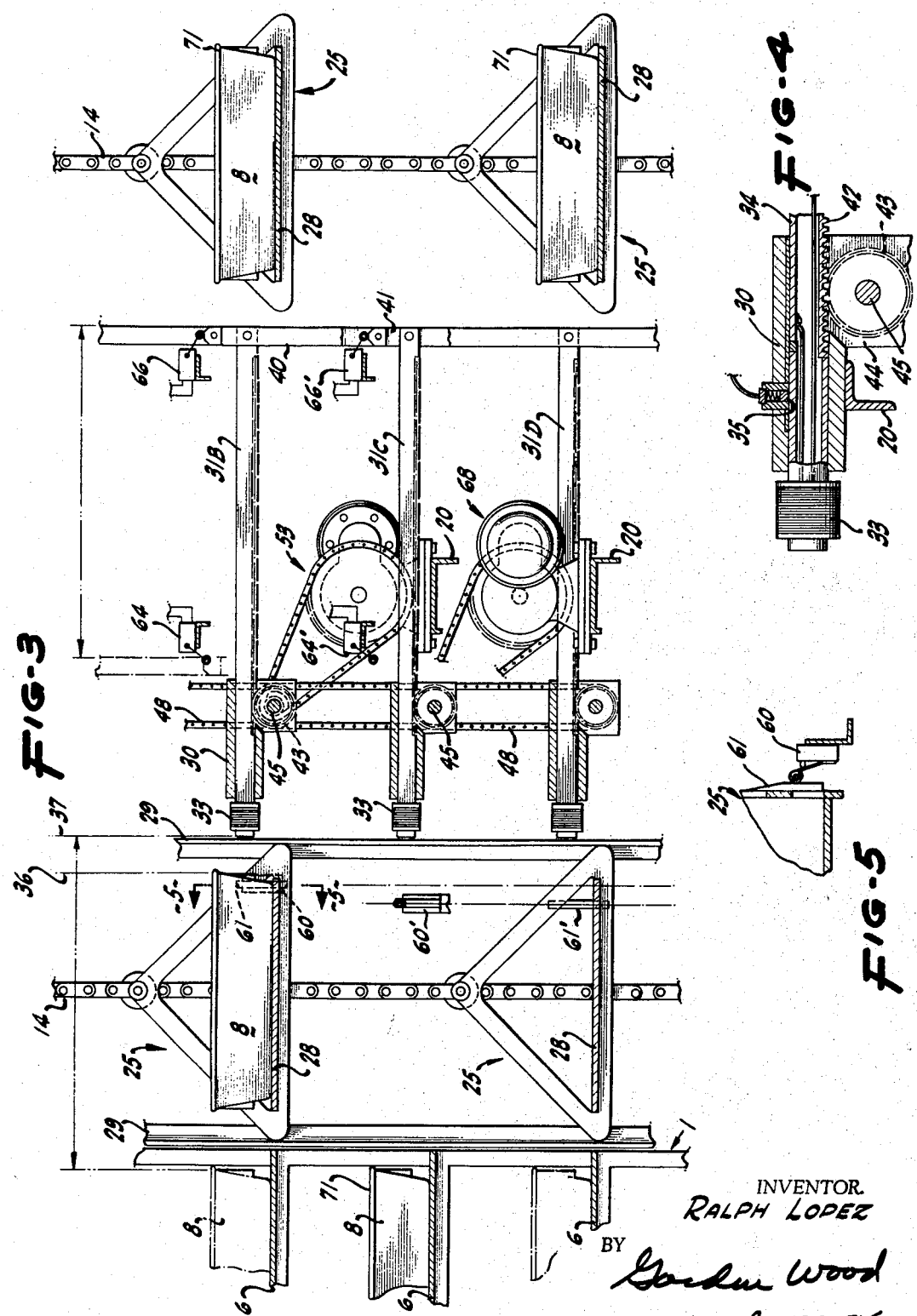

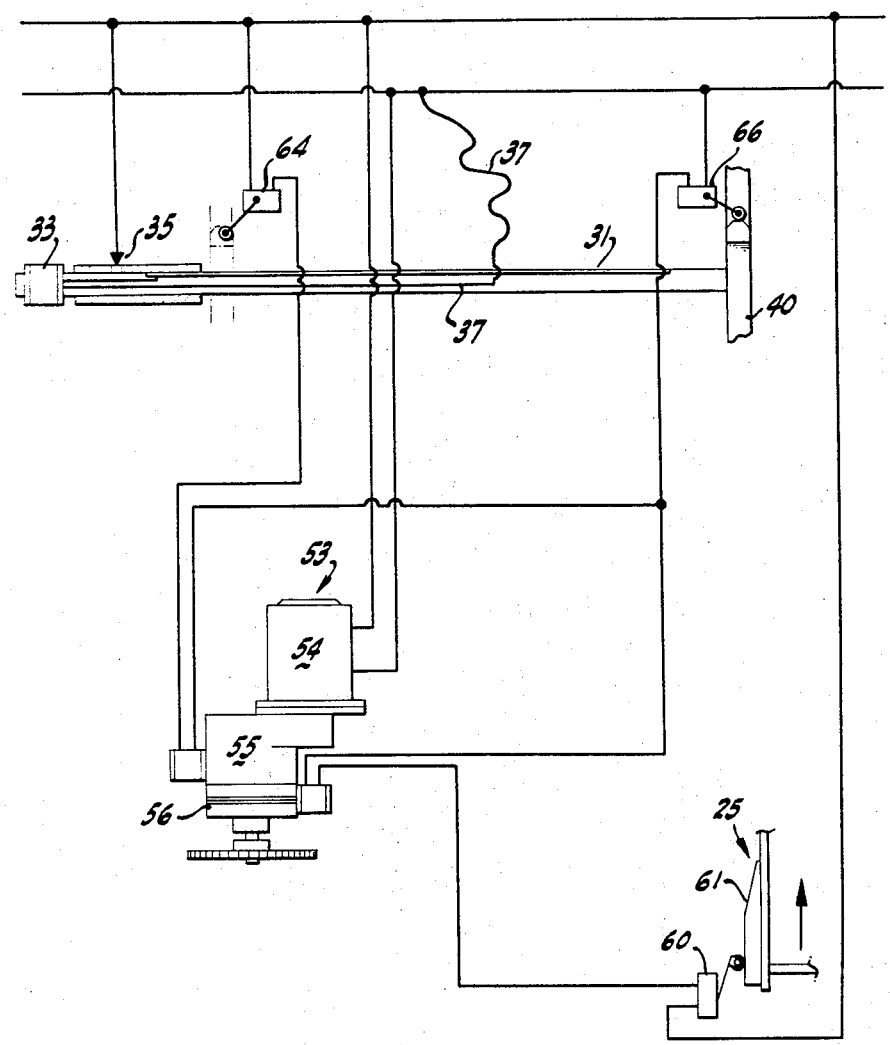

3,403,794
APPARATUS FOR STACKING AND
UNSTACKING ARTICLES
Ralph Lopez, 1734 Church St.,
San Francisco, Calif. 94131
Filed Apr. 15, 1965, Ser. No. 448,423
2 Claims. (Cl. 214—16.6)

ABSTRACT OF THE DISCLOSURE

Apparatus for stacking and unstacking articles including an endless conveyor arranged to provide a pair of horizontally spaced vertically extending runs. Provision is made for moving articles to and from article supporting platforms on one run of the conveyor relative to a stationary rack and means is provided for removing and loading articles one at a time on the other run of the conveyor.

---

This invention relates to a method and apparatus for stacking and unstacking articles and is particularly adapted for use in the baking industry for stacking and unstacking baking pans. The invention will hereinafter be described with respect to its use with baking pans but it will be understood that it is applicable to use with other articles when the problem of stacking or unstacking such articles exists.

The invention will be described in connection with the specific operation of handling baking pans such as pans in which loaves of bread are baked and which are required to be conveyed from shelves of a mobile rack to a horizontally extending conveyor leading to the baking oven. The invention will be described as used on "pan straps" which, in the baking industry, are groups of four, five or six pans interconnected by strap members so as to permit handling them as units.

The environment in which the present invention is particularly adapted for use is disclosed in Patent No. 2,718,972 dated September 27, 1955. In said patent one method of conveying the pan straps to the baking oven is disclosed which is fairly representative of the prior art. Briefly, the step in the baking process to which this invention applies is that of transferring the pan straps from the "proofing box" to the inlet end of the oven. The pan straps are removed from the proofing box and stacked on a mobile rack consisting of a plurality of vertically spaced shelves and said rack is then conveyed from the proofing box area to the inlet end of the oven to which the pan straps are conveyed along a horizontally extending path of travel. In the cited patent one means is disclosed for transferring the vertically stacked pan straps from the shelves of the mobile rack to a horizontally extending conveyor. The present invention will be described in connection with this portion of the baking operation.

One of the main objects of the present invention is the provision of a method and apparatus for automatically transferring the pan straps from the mobile rack to the inlet end of the baking oven in a much less expensive manner than has been possible heretofore.

Another object of the invention is the provision of a method and apparatus for carrying out any unstacking operation in which it is desired to transfer articles from vertically spaced apart tiers to a horizontally extending path of travel.

Another object of the invention is the provision of a method and apparatus which is equally adaptable to the operations of stacking and unstacking articles with reference to one point and a plurality of vertically spaced apart tiers.

Still another object of the invention is the provision of a method and apparatus for stacking and unstacking articles which lends itself to adaptation to a continuously moving conveyor and which adequately solves the problem of converting intermittent motion of the stacks, such as takes place in a mobile rack during the baking operation, to continuous movement as on a conveyor or the like analogous to the oven feeding conveyor in a bakery.

Yet another object of the invention is the provision of an apparatus adapted for unstacking and stacking articles and which apparatus takes up a minimum amount of space at the site where the operation is to be performed.

Another object of the invention is the provision of a stacking and unstacking apparatus that permits the use of a continuously moving conveyor having horizontally spaced apart vertically extending runs between which runs the mechanism for actuating the apparatus may be positioned, thus reducing the space required for the installation.

Other objects and advantages will be apparent from the following specification and from the drawings.

FIG. 1 is a semischematic side elevation of the preferred form of the apparatus of the present invention designed to perform the stacking and unstacking steps with reference to a mobile rack such as is used in bakeries.

FIG. 2 is a greatly enlarged horizontal sectional view taken in a plane indicated by lines 2—2 of FIG. 1.

FIG. 3 is an enlarged fragmentary side elevation partly in section showing in more detail the operation of the article moving means.

FIG. 4 is an enlarged vertical cross section of one bearing of the reciprocable transfer mechanism.

FIG. 5 is a fragmentary vertical section of one of the article supports showing the switch actuating means.

FIG. 6 is a schematic view of a typical transfer mechanism.

First with reference to FIG. 1, the invention is disclosed in combination with a mobile rack generally designated 1 which is similar in many respects to rack 35 disclosed in Patent No. 2,718,972. Details of the apparatus for moving rack 1 not disclosed herein may be understood by reference to said Patent No. 2,718,972.

Rack 1 is provided with an upper hanger member 2 from which the rack may be supported for movement along a horizontally extending path of travel on a trolley rail. For the purpose of steadying the rack 1 at its lower end a pair of angle bar guides such as indicated at 3 and 4 may be provided. Received between said guides is a downwardly extending extension 5 integral with rack 1.

Rack 1 essentially consists of a plurality of vertically spaced apart shelves 6 secured together by suitable frame members. Each shelf 6 serves as a support for carrying a tier of one or more pan straps 7. In this disclosure it will be assumed that each pan strap 7 consists of four pans 8 tied together by means of suitable flat bars or the like to form an integral unit. Only one pan strap is shown in each tier although more than one is also contemplated.

In FIG. 1 there is also indicated schematically a belt conveyor 10 on which the pan straps 7 are conveyed to the oven (not shown).

Interposed between the rack 1 and the conveyor 10 is the apparatus of the present invention which essentially comprises a closed conveyor generally designated 11 comprising a pair of parallel chain loops 13, 14 (FIG. 2) arranged so as to provide a pair of vertically extending runs moving in opposite directions and a pair of upper and lower horizontally extending runs connecting said vertical runs. The chains 13, 14 are supported by pairs of sprocket wheels 16, 17 at the upper end of the apparatus and similar pairs of sprockets 18, 19 at the lower end of the apparatus. The shafts of sprockets 16 to 19 may be suitably supported in bearings mounted on a frame, portions of which are indicated at 20.

The shaft of sprocket 18 may be driven by means of chain 21 from a combination motor and speed reducer generally designated 22. By this means the conveyor is driven continuously at all times. At this point it may be noted that the present invention contemplates the driving of the conveyor with an intermittent motion as well as at a uniform speed. However, it will be apparent that by the method and apparatus disclosed herein the invention lends itself to use with either an intermittent motion or a continuous motion of the main conveyor.

Suspended between corresponding links of chains 13, 14 are a plurality of equally spaced apart platforms generally designated 25. Each platform 25 includes a pair of end members 26, 27 pivotally secured at their upper ends to chains 13, 14 respectively. The end members 26, 27 are tied together by a horizontally extending bottom 28 which is adapted to support one or more pan straps.

Since it is desirable to prevent shifting of the platforms 25 as well as the rack 1 during the operation of transferring the pan straps to the conveyor platforms, the vertically extending run of the conveyor that is adjacent the rack 1 is steadied by means of four vertically extending angles 29 within which the ends 26, 27 are slidably received. Said angles 29 extend from a point below the rack 1 to a point above the rack 1. Similar angles are provided at the opposite vertical run.

Although the operation of transferring the pan straps from rack 1 to the platforms 25 of conveyor 11 will subsequently be described, it should be noted at this point that by the method of the present invention the pan straps 7 are transferred, a group of tiers at a time, from rack 1 to corresponding platforms on conveyor 11 and the pan straps are thereafter moved upwardly and then horizontally to the right (FIG. 1), and then downwardly along the opposite vertically extending run and are then removed one tier at a time from the platforms 25 and pushed onto the conveyor 10. As will subsequently be noted, the invention also contemplates the reverse operation in which articles may be transferred from a conveyor such as conveyor 10 to the platforms 25 and thereafter moved by groups onto rack 1.

Supported on frame 20 by any suitable means are a plurality of tubular bearings 30 (FIGS. 2, 3, 4) in which are slidably received elongated transfer elements in the form of tubes 31. These tubes are preferably rectangular in cross section and bearings 30 are formed complementarily thereto.

The elongated tubes 31 and their associated bearings 30 are preferably arranged in pairs so that two tubes act as a transfer means on each of the pan straps to be transferred (FIG. 2). The tubes 31 are each provided at one of their corresponding ends with a magnetic solenoid 33 which is adapted to be magnetized when the tubes 31 are moved to the left of the position shown in FIGS. 1, 2 and 3 to a position with the solenoids 33 closely adjacent the pan straps 7 on rack 1. The solenoids 33 are energized at this point so as to pull the pan straps 7 onto the platforms 25 as the tubes 31 return to their normal inoperative position shown in the drawings. As best seen in FIG. 4, each tube 31 is provided with an insulated strip 34 of conducting material such as copper which is adapted to cooperate with a spring urged brush 35 reciprocally received within a bore 36 in each bearing 30 (FIG. 4). The length of the conducting strip 34 is such that the associated circuit is energized only during that portion of the stroke of tubes 31 between the pan straps 7 on rack 1 and the desired position of the pan straps on the platforms 25. Thus, on the return stroke of tubes 31 the insulated strip 34 is positioned with reference to the tube so that the pan strap is released at the line indicated at 36 in FIG. 3 to permit the solenoids 33 to continue to the position indicated by line 37 at which latter position they are free from interference with the platforms 25. A flexible lead 37 is of course connected between the brush 35 and the electrical circuit through the hollow center of the tube 31 (FIG. 6).

Although the present invention contemplates the transfer of all of the pan straps 7 simultaneously from the rack 1 onto the corresponding platforms of conveyor 11, means is disclosed for simultaneously transferring a group of pan straps comprising alternate pan straps on rack 1. The provision of such means is desirable because it will be seen from FIG. 1 that the spacing between platforms 25 on conveyor 11 must be sufficiently great to permit clearance between adjacent platforms during the horizontal movement of such platforms on the horizontal upper and lower runs. Thus, the spacing between the platforms 25 on conveyor 11 must be slightly greater than the total width of each platform, otherwise interference will result. For this reason it is necessary to successively transfer groups of alternate articles in order to permit relatively close stacking of the articles such as the pan straps on rack 1. By the present invention a group of articles comprising every other article on the stack is transferred at one time and thereafter a group comprising the remaining intermediate articles is then transferred. The present invention also contemplates a three-step transfer by which a group consisting of every third article is transferred at one time in order to permit the desirable close stacking of the articles on a rack such as rack 1.

For the above reasons alternate sets of transfer members 31 are tied together by means of tie bars 40 and another group of transfer members 31 that are intermediate the first mentioned group are tied together by tie bars 41.

Each tube 31 is provided along its lower edge with a rack 42 (FIG. 4) which cooperates with a gear 43 rotatably supported in a housing 44 secured to each bearing 30. The gears 43 are mounted on shafts 45 which in turn are driven by sprockets. In FIG. 1 the sets of transfer members 31 are identified by letters A through H and alternate sets of members 31A, 31C, 31E and 31G are driven together by means of connecting chains 48 which cooperate with the sprockets 49 on shafts 45 so that the above mentioned alternate tube sets may be driven simultaneously from one of the shafts 45 as indicated in FIG. 2. To this end another sprocket wheel 50 is provided on shaft 45 so that said shafts 45 may be driven through a chain 51 from a sprocket wheel 52 connected to the output shaft of a source of power generally designated 53. This power source preferably comprises a motor 54, a reversing gear unit 55 and a magnetic clutch 56. The motor 54 may run continuously and the power to shaft 45 may be connected by actuation of clutch 56 when the circuit of the same is closed by switch 60 (FIG. 5). Switch 60 cooperates with a camming element 61 carried by certain of the platforms 25 of conveyor 11. With reference to the example shown in FIG. 1 it will be apparent that the camming element 61 is positioned on every fifth platform 25 since it is required to actuate the transfer means 31A, 31C, 31E and 31G simultaneously for transferring the pan straps on four of the shelves 6 of rack 1. At this point it may be noted that the switch corresponding to switch 60 that initiates the transfer step for the succeeding four platforms is actuated when said succeeding four platforms are in positions intermediate the positions at which the first mentioned four platforms undergo the transfer operation.

Upon actuation of clutch 56 shaft 45 is driven to rotate gears 43 (FIG. 3) in a counterclockwise direction (FIG. 4) for advancing the transfer mechanism to bring the solenoids 33 to a position closely adjacent the corresponding pan straps 7 on rack 1. Upon movement of the transfer mechanism a predetermined distance switch 64 is actuated to close a circuit that includes the solenoid actuated reversing mechanism 65 interposed between clutch 56 and motor 54 (FIG. 6). The transfer mechanism is then reversed and returns to its initial position as shown in FIGS. 2 and 3 at which point a limit switch 66 interrupts the circuit of magnetic clutch 56 thereby stopping the power means. The clutch 56 is preferably of the type that undergoes a predetermined number of cycles before stopping so that it always moves through a certain number of cycles and never stops between the ends of a cycle. Switch 66 has a double function. In addition to interrupting the circuit of clutch 56 it also reverses the reversing gear unit 55 so that the transfer mechanism is ready for the next transfer cycle as above described.

It will be understood that the transfer mechanism that includes transfer means 31B, 31D, 31F, and 31H may be actuated by a mechanism similar to that above described and which mechanism is generally designated 68 in FIG. 2. The same type of chain drive arrangement described above is also employed for the simultaneous rotation of transfer means 31B, 31D, 31F and 31H.

It will be understood that in most operations and especially in the application of the invention to handling baking pans, conveyor 11 moves at a relatively slow rate of speed and thus sufficient time is permitted to actuate the transfer mechanisms without interference between such transfer mechanisms and the conveyor 11. In this connection it will be understood that the operation of the transfer mechanism to the left from the positions of FIGS. 2 and 3 will commence before the bottoms 28 of platforms 25 approach the position of FIG. 3 and that the pan straps will be released about the time the bottom 28 reaches the position of FIG. 3. If necessary, the conveyor 11 may of course be provided with a momentary hesitation when the platforms are at their transfer positions.

In FIG. 1 there is indicated a transfer mechanism 70 consisting of a pair of tubes similar to the above described tubes 31 and which mechanism is driven in a manner analogous to the above described transfer mechanisms. In this case it is necessary that the transfer mechanism 70 be actuated to discharge the load of each platform 25 and for this reason the switch on transfer mechanism 70 corresponding to the switch 60 above described is positioned for actuation by each platform and not for every four platforms as in the case of the loading operation. The solenoid of transfer mechanism 70 is of course not required if an unstacking operation is performed, but it will be apparent that for a stacking operation the transfer mechanism 70 should be provided with solenoids and, in such an event, the solenoids of the transfer mechanisms for loading the articles onto the rack 1 will then not be required. However, it should be understood that the above described method and structure is adapted for operation both for stacking and unstacking articles with reference to vertically disposed tiers such as those present in rack 1. In the stacking operation a frictional stop 73 may cooperate with the articles coming from conveyor 10 for properly positioning the same to be picked up by solenoid.

It will be apparent from FIG. 3 that in the step of transferring the pan straps 7 to the platform 25 the bead 71 or similar reinforcing element which is normally found on pan straps at the upper periphery of the same cooperates with the transfer mechanism to prevent slipping of the load downwardly from the transfer mechanism during the movement of said load from the rack 1 to the platform 25.

The present invention also contemplates the provision of a mechanical latching element to replace the solenoids. Such a latching element may cooperate with the bead 71 or other reinforcing strip to grip the pan strap and which latching element is released by a camming means when the load has been transferred to the platform 25.

One of the outstanding advantages of the above described method and apparatus resides in the fact that the operation lends itself to continuous movement as distinguished from intermittent step by step transfer operations. The conveyor 11 can be run continuously and, in the event there is no rack 1 with articles to be transferred in the proper position, the articles are not transferred although the operation of the apparaus is unchanged.

The above specific description of the preferred form of the invention should not be taken as restrictive as it will be apparent to those skilled in the art that minor variations in design may be resorted to without departing from the scope of the following claims.

I claim:
1. Apparatus for stacking and unstacking articles comprising:
   rack means for stacking a plurality of articles in vertically spaced apart tiers,
   an elongated conveyor provided with a plurality of article supporting platforms equally spaced along the length of said conveyor,
   said conveyor being arranged to provide an endless circuit including a pair of horizontally spaced vertically extending runs and a pair of generally horizontally extending runs connecting said vertical runs,
   means for moving said conveyor continuously at a predetermined speed,
   first article moving means for simultaneously moving a pair of selected articles horizontally from a respective pair of platforms on said conveyor to vertically spaced apart positions on said rack means and vice versa,
   second article moving means for moving one of said articles from its platform on said conveyor to said rack means to a position intermediate said vertically spaced apart positions of said pair and vice versa,
   said first and second article moving means including alternately arranged article engaging elements mounted adjacent one of said vertically extending runs of said conveyor,
   means for alternately actuating said elements for loading and unloading said rack means,
   means at a point along the length of the other of said vertically extending runs for moving said articles one at a time along a horizontally extending path of travel to and from said platforms.
2. Apparatus according to claim 1 wherein said first and second article moving means are interposed between said vertical runs.

References Cited
UNITED STATES PATENTS

| | | | |
|---|---|---|---|
| 742,488 | 10/1903 | Polk | 214—16.6 X |
| 1,234,493 | 7/1917 | Ross | 214—16.6 X |
| 1,826,357 | 10/1931 | Makutchan | 214—16.1 |
| 2,324,930 | 7/1943 | Joa. | |
| 2,502,940 | 4/1950 | Gelbman | 214—16.4 X |
| 2,663,476 | 12/1953 | Romain | 214—16.1 |
| 2,704,609 | 3/1955 | Zeckindorf et al | 214—16.1 |
| 2,751,093 | 6/1956 | Theiboult | 214—16.1 |
| 3,033,391 | 5/1962 | Schubert | 214—16.4 |
| 3,040,871 | 6/1962 | Lombard | 214—16.4 |
| 3,068,987 | 12/1962 | Franklin | 214—16.6 |

FOREIGN PATENTS

| | | |
|---|---|---|
| 985,054 | 3/1965 | Great Britain. |
| 922,520 | 1/1955 | Germany. |
| 1,177,551 | 9/1964 | Germany. |

GERALD M. FORLENZA, *Primary Examiner.*

R. B. JOHNSON, *Assistant Examiner.*